2,934,563
Patented Apr. 26, 1960

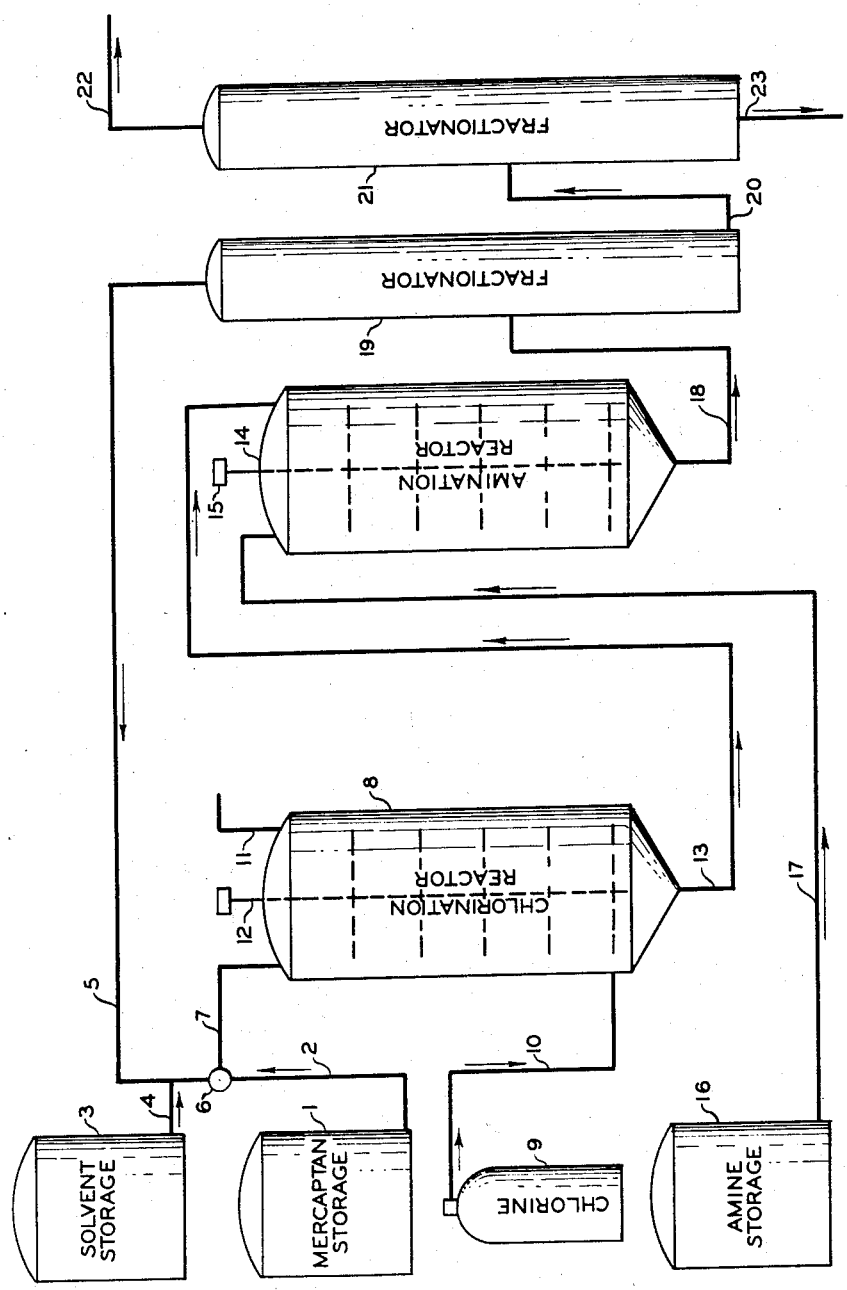

United States Patent Office 2,934,563

PRODUCTION OF TERTIARY ALKYL THIO SULFENYL CHLORIDES

Chester M. Himel, Menlo Park, Calif., assignor to Phillips Petroleum Company, a corporation of Delaware Application October 21, 1953, Serial No. 387,386

9 Claims. (Cl. 260—543)

This invention relates to sulfur-containing organic compounds and to their preparation. In one aspect, this invention relates to alkyl thiosulfenyl halides as new compounds. In another aspect this invention relates to the preparation of alkyl sulfur-containing halides by reacting a halogen with an alkyl mercaptan and/or a dialkyl disulfide. In still another aspect this invention relates to a method for reacting a halogen with a dialkyl disulfide and/or a mercaptan wherein a thiosulfenyl halide and a sulfenyl halide are formed, either of the said halides being formed as principal reaction product in accordance with regulation of reaction temperature. In a further aspect of this invention it relates to the reaction of halogen with a dialkyl disulfide and/or an alkyl mercaptan each containing a tertiary alkyl radical, to produce a tertiary alkyl sulfenyl halide and a tertiary thiosulfenyl halide.

This application is a continuation-in-part of my copending application Serial No. 89,475, filed April 25, 1949, now abandoned, the latter being a continuation-in-part of Serial No. 617,871, now abandoned, filed September 21, 1945.

An object of this invention is to provide a method for preparing sulfur-containing organic compounds.

Another object of this invention is to provide a method for preparing alkyl sulfenyl halides.

A further object of this invention is to provide a method for preparing alkyl thiosulfenyl halides, which are novel compounds.

Therefore, a further object of this invention is the production of said novel compounds, that is, alkyl thiosulfenyl halides.

Another object of this invention is to effect halogenation of an alkyl mercaptan and/or a dialkyl disulfide at conditions such that alkyl sulfenyl halides are the principal reaction products.

An additional object of this invention is to effect halogenation of an alkyl mercaptan or a dialkyl disulfide at conditions such that alkyl thiosulfenyl halides are the principal products of the reaction.

In accordance with this invention, an alkyl mercaptan is caused to interact with a halogen to form at least one of an alkyl sulfenyl halide and a tertiary alkyl thiosulfenyl halide. Also, in accordance with this invention, a dialkyl disulfide is caused to interact with a halogen to form at least one of an alkyl sulfenyl halide and a tertiary alkyl thiosulfenyl halide.

The principal reaction product can be isolated, and reacted, or reacted as a component in the resulting reaction mixture, with at least one nitrogen compound selected from the group consisting of ammonia and primary and secondary amines to form a sulfenamide and/or a thiosulfenamide as the principal reaction product, as described in copending application Serial No. 395,139, filed November 30, 1953, now U.S. Patent No. 2,807,615. In said application there is also described a 1-step process for making sulfenamides and thiosulfenamides.

The above reaction, in one embodiment, is conducted employing an inert solvent. Further, in another embodiment, substantially anhydrous conditions are employed and such conditions can prevail in the presence of an inert solvent or diluent or in the absence of such inert solvent or diluent. It is noted herein that anhydrous conditions are not essential to obtaining of the halogenated sulfur product compounds. Thus, good yields are shown herein to have been obtained in the presence of water. Such yields can be obtained whether or not an inert diluent or solvent is employed.

Alkyl sulfenyl halides are particularly useful as intermediates for the production of other compounds, such as the corresponding sulfenamides which can be used as additives for lubricating oil, as leather processing chemicals, surface active agents, flotation agents, resin intermediates, etc. Alkyl thiosulfenylhalides are also versatile intermediates for the production of useful organic chemicals. Being highly reactive, they combine substantially quantitatively with a wide variety of reactants to provide sulfur containing products of wide utility. Tertiary alkyl sulfenyl halides are particularly well applied to the preparation of tertiary alkyl sulfenyl thiocyanates as set forth and claimed in U.S. Patent No. 2,572,565 issued October 23, 1951 to Chester M. Himel and Lee O. Edmonds.

Alkyl mercaptan or dialkyl disulfide reactants of any desired molecular weight can be employed, although generally the said reactant is one having about twelve carbon atoms per alkyl group, or less. The alkyl groups of the dialkyl disulfide can be the same or different.

Included in the halogen reactants employed are chlorine, bromine, iodine, and fluorine, and of these, chlorine is now preferred due to its low cost and ready availability. Bromine and iodine are ordinarily used in the liquid and solid state, respectively. At higher temperatures, i.e, above —30° F., chlorine can be used either in the liquid state or in the gaseous state. At lower temperatures, chlorine is in the liquid state at the optimum reaction temperatures, and it is preferred to use it in this form.

Ordinarily, the modus operandi preferred will be the addition of halogen to the mercaptan and/or the disulfide, either batchwise or in a continuous operation. When operating on a continuous basis substantially equimolar proportions of reactants can be admixed together or the halogen can be added step-wise to the sulfur-containing compound in which event provisions should be made as required, for example, to cool the reacting mass. When operating batchwise the halogen is added to the mercaptan or disulfide gradually and usually in an amount not to exceed one mol of halogen per mol of mercaptan or disulfide.

It is generally advantageous, although not required, to conduct the halogen-mercaptan or disulfide reaction in the presence of a solvent inert chemically to the reaction mixture. As such an inert solvent in my process I prefer to employ a paraffin hydrocarbon since the yield and purity of the products are usually higher with this type of solvent than with other solvents. Low-boiling, normally liquid paraffins, for example, normal pentane, iso-pentane or normal hexane are particularly applicable since they have the advantages of chemical inertness and low boiling point, the latter characteristic rendering them easily removable from the reaction product by fractionation. Higher boiling paraffins can be employed, if desired, but they are less preferable because their high boiling point causes difficulty in separating the solvent from the product.

While I have generally preferred to employ a single hydrocarbon as the solvent, mixtures of hydrocarbons can be employed. For example, suitable cuts or fractions of natural gasoline or any other suitable paraffin mixture which is free from objectionable impurities can be used. Best results are obtained when the solvent is free from appreciable amounts of sulfur and sulfur compounds, oxygen compounds, nitrogen compounds, unsaturated hydrocarbons such as olefins, diolefins and acetylenes, aromatics, naphthenes and any other impurities which would interfere with the reaction or contaminate the product.

Instead of paraffin hydrocarbons, other inert organic solvents can be employed in my process. Among these solvents are chlorinated hydrocarbons such as chloroform, carbon tetrachloride, ethylene dichloride, ethylidene dichloride, etc. In some instances, the use of halogenated solvents tends to reduce the yield of the desired product, and in such instances, those solvents are less desirable than the preferred paraffin hydrocarbon solvents. Further, refinery streams containing mercaptans and/or disulfides can be used in my process, provided these streams are free of objectionable impurities described above.

The reaction of halogen with mercaptan or disulfide can be carried out in the absence of an extraneous solvent or diluent. When starting with disulfide in the absence of other material which acts as a diluent or solvent, it is preferred to add less than the stoichiometric amount of halogen and thus have present at all times unreacted disulfide. When starting with mercaptans in the absence of other material which acts as a diluent or solvent, it will be necessary to add sufficient halogen to convert all the mercaptan to disulfide and then proceed as stated above for disulfide.

The reaction of this invention can be accomplished over a wide range of temperatures. I have obtained products in substantial yield at temperatures approximating 400° F. and at temperatures as low as −300° F. When using the more readily available reactants I usually prefer to employ a temperature in the range of about −125° F. to about 250° F., preferably −125° F. to about 150° F. For reasons which appear herein, the said ranges are presently preferred. Though certain ranges are preferred, temperature is not critical in the sense that the reactions of the invention do not appear to be limited to the specific ranges herein set forth. Thus, temperatures somewhat higher than herein set forth are operative.

In the practice of one embodiment, when a primary or secondary alkyl mercaptan or dialkyl disulfide is employed, the principal reaction product is an alkyl sulfenyl halide; and when employing a tertiary alkyl or dialkyl disulfide, the principal reaction product is dependent upon the reaction temperature employed. More specifically, when employing the tertiary alkyl mercaptan or disulfide reactant, I have found that, when the temperature is within the range of −300 to −30° F., and preferably within the range of −125 to −50° F., the principal reaction product is the tertiary alkyl thiosulfenyl halide. I have found further that, when I use temperatures above −30° F., and preferably from 40 to 250° F., the principal reaction product is the tertiary alkyl sulfenyl halide. At these higher temperatures and at temperatures above the range of this embodiment, the formation of the tertiary alkyl thiosulfenyl halide proceeds concomitantly with the formation of the tertiary alkyl sulfenyl halide, but the latter is the principal product of the reaction and the former is formed in a smaller proportion than at temperatures below −30° F.

The pressure of reaction is ordinarily maintained at substantially atmospheric, but higher or lower pressures can be employed. For example, if butane or propane is used as the solvent, the pressure should be sufficiently high to maintain it in the liquid state. In some cases the pressure can be sufficiently high to hold the chlorine, when it is used as the halogen for the reaction, in the liquid state, but insufficiently great to liquefy the hydrogen chloride liberated during the reaction.

In one embodiment the mercaptan or disulfide is preferably maintained in the liquid state during the halogenation. This can be accomplished by adjusting the temperature and pressure, either in the presence or absence of a solvent or diluent.

In accordance with one embodiment in which I employ a temperature of −30° F. and lower, I prefer to use a solvent such as a low molecular weight hydrocarbon, e.g., propane, butane, pentane, etc., which is normally liquid at the reaction temperature. In some instances, it can be desirable to choose a solvent that boils at the optimum reaction temperature. The reaction is advantageously conducted under the vapors of the refluxing solvent which provides an inert atmosphere over the reaction mixture. In the event that the solvent employed does not boil at the optimum temperature level for the reaction, a suitable blanketing gas, such as nitrogen, can be introduced to provide the desired inert atmosphere.

When operating at the lower temperatures suitable for the formation of the tertiary alkyl thiosulfenyl halides, I prefer to use tertiary dialkyl disulfides as the starting material, but tertiary alkyl mercaptans can be used. When starting with tertiary alkyl mercaptans, for best results I regulate the proportion of mercaptan to halogen in the feed stream in such a manner that the mercaptan is first converted to the disulfide which then is an intermediate in the reaction. After conversion of the mercaptan to the disulfide, the reaction proceeds to the formation of the tertiary alkyl thiosulfenyl halide.

When a reaction is effected between a primary or a secondary alkyl mercaptan or a primary or secondary dialkyl disulfide and a halogen and between a tertiary alkyl mercaptan or dialkyl disulfide and a halogen at a temperature above −30° F., the principal reactions can be expressed as follows:

(1) $RSH + X_2 \rightarrow RSX + HX$ (2) $RSSR + X_2 \rightarrow 2RSX$ wherein R represents an alkyl radical and X represents a halogen. When a reaction is effected between a tertiary alkyl mercaptan or dialkyl disulfide and a halogen at a temperature below −30° F., the principal reaction can be expressed as follows:

(3) $RSSR + X_2 \rightarrow RSSX + RX$ wherein R represents a tertiary alkyl radical and X represents a halogen. It will be understood that in Equation 3 the RSSR compounds can be formed from corresponding mercaptans whose formula can be expressed as RSH and that it is within the scope of my invention to produce the compounds shown as RSSX in Equation 3 from mercaptans.

As can be noted from the foregoing description of the invention, according to this invention, I have discovered that it is possible to obtain an alkyl sulfenyl halide and/or an alkyl thiosulfenyl halide if the halogen and the mercaptan and/or dialkyl disulfide are caused, respectively, to interact in equimolar proportions. One way to cause such an equimolar reaction is to employ equimolar ratios of reactants. Of course, if less halogen is passed into the reaction mass than is molecularly equivalent to the alkyl mercaptan or to the dialkyl disulfide, then less of the desired product will be obtained. However, the point to note is that the invention is in the finding that equimolar ratio reaction in the reaction mass can be obtained to form the products here discussed. Therefore, herein and in the claims the invention is not limited to any particular modus operandi or proportions actually taken to obtain as a net result an equimolar reaction forming the alkyl sulfenyl halide and/or the alkyl thiosulfenyl halide in the reaction mass, unless specifically so stated. Accordingly, an excess of halogen, althrough not desired, can be employed provided the reaction in nevertheless by conditions employed caused to be equimolar.

When referring to "equimolar proportions" herein and in the claims it is to be understood to mean that "equimolar proportions" is that proportion of halogen which is chemically interacted in the reaction mass with the said mercaptan and/or disulfide to yield at least one of the group of alkyl sulfenyl halide and tertiary alkyl thiosulfenyl halide. In other words, "equimolar proportions" is a limitation based upon the reaction equation set forth herein, which is a visual representation of that which present methods of analysis which have been employed indicate to be occurring when halogen and mercaptan and/or disulfide reactants are contacted each with the other, the proportions of halogen being so selected that appreciable quantities of alkyl sulfenyl halide and tertiary alkyl thiosulfenyl halide are formed. Thus, the invention herein covered is accomplished in one embodiment, by merely passing halogen in contact with the disulfide and/or mercaptan reactant until by testing, an appreciable quantity of alkyl sulfenyl halide and/or tertiary alkyl thiosulfenyl halide have been formed in recoverable amounts.

By "reaction" herein and in the claims is meant reaction conditions are arranged with respect to proportion of reactants and other conditions to obtain an appreciable proportion of the product of the claim as a result of an equimolar reaction of the halogen with the mercaptan and/or the dialkyl disulfide.

The rate of addition of halogen can be so regulated that free halogen does not appear in the vent gases. As a feature of the invention, it is desirable to vent the system through a refrigerated condenser maintained at a temperature such that halogen will be condensed and returned to the reactor while hydrogen halide passes through unchanged. Also, if a diluent is employed which is vaporized at the reaction conditions, it will be condensed and returned to the reaction zone by such a condenser. By so operating, the rate of reaction can be somewhat accelerated.

When the mercaptan or disulfide used tends to be vaporous at the temperature of reaction, sufficient pressure to keep it in the liquid phase can be employed. Such a pressure when the reactant tends to be vaporous is now preferred.

The addition of halogen will be accomplished at a pressure sufficient to maintain a desired inflow of the same at each operating pressure. The rate of halogen addition can be varied over a rather wide range. Since the reaction of this invention is exothermic in nature, the maximum rate of halogen addition will be dependent on the maximum rate at which heat can be removed from the reaction mixture. That is, the halogen must not be added at a rate greater than that at which the heat can be removed and at the same time keep the temperature of the reaction mass below the desired maximum. Also the rate will usually not exceed a rate such that the halogen is substantially completely reacted as it is added. Preferably this rate will be in the range of about 1 to about 25 mols of halogen per mol of sulfur-containing compound per hour.

Although the halogen-mercaptan and/or halogen -dialkyl disulfide reaction of this invention can be conducted in the presence of water, somewhat higher yields of halide products are obtained at lower water concentrations. However, I have found that it is not generally advantageous, nor necessary, to dry the reactant materials to be introduced into the halide-forming reaction zone, reactants in their normal state of purity generally being sufficiently devoid of water that a product yield, substantially the same as that obtained when predried reactants are employed, is obtained.

As stated, the alkyl sulfenyl halides and alkyl thiosulfenyl halides produced in accordance with my invention are useful as intermediates for the production of other chemical compounds, particularly, by amination to produce sulfenamides. When it is desired to produce other compounds, such as sulfenamides, reactions with either the alkyl sulfenyl halides or the alkyl thiosulfenyl halides can be effected without separating the halides from the reaction mixture resulting from the halogenation reaction. If desired, however, the halide can be recovered in any suitable way from the reaction mixture resulting from the halogenation prior to its use in an amination reaction.

To effect an amination of the alkyl sulfenyl or thiosulfenyl halides produced by the halogenation reaction described herein the halide is ordinarily reacted with ammonia or with a primary or secondary amine by adding the ammonia or amine to the reaction mixture resulting from the halogenation reaction. This eliminates the expense and inconvenience of isolating or purifying the halide. In some cases it may be desirable to add the reaction mixture containing the halide, to the amine. When reacting primary or secondary sulfenyl halides with amines, it is preferred to add the sulfenyl halide solution to the amine, in order to obtain the highest possible yield.

The accompanying diagrammatic drawing depicts a preferred embodiment of my invention without the inclusion of such standard equipment as pumps, compressors, etc., in order to make the drawing readily understandable.

Referring to Figure 1, an alkyl mercaptan (and/or a dialkyl disulfide, if desired) is drawn from storage 1 via line 2 and admixed with solvent withdrawn from storage 3 via line 4 and from recycle line 5 (to be described below). The solvent and mercaptan are mixed in a suitable mixing device 6, and the resulting mixture passes via line 7 to halogenation reactor 8. Chlorine from storage 9 passes to reactor 8 via line 10. It is preferable to bubble the chlorine slowly through the resulting solution until an amount of chlorine which is stoichiometrically equivalent to the mercaptan, has been introduced. However, in any event, the reactants are added in any desired relative amounts so as to effect equimolar reaction of halogen with disulfide and/or mercaptan to form alkyl sulfenyl halide and/or tertiary alkyl thiosulfenyl halide products. In this way the chlorine is reacted substantially as rapidly as it is added and the presence of free chlorine in any substantial amount in the solution is avoided. The chlorine is introduced at a rate such that substantially all of it is reacted before it can leave the solution. If desired, the reaction zone can be provided with a condenser to condense from the vent gases any material higher-boiling than hydrogen chloride including any cholrine which appears therein and to return same to the reaction zone. Such a condenser allows the hydrogen chloride to escape from the system without allowing any chlorine or solvent to escape. Removal of the hydrogen chloride is desirable because it displaces the equilibrium in the desired direction. Reactor 8 is provided with line 11 for venting the hydrogen chloride and with agitator 12 for suitable agitation and intimate contact of the reactants. Intimate contact can be obtained in any other manner such as by the use of centrifugal mixing pumps, jets, orifices, etc. If desired the reaction can be carried out in a vertical column equipped with packing or bubble plates for promoting intimate contact, with a reboiler at the bottom and with means for refluxing at the top of the column with only hydrogen chloride pasing overhead. The mercaptan, solvent and the chlorine can be introduced at appropriate intermediate points in the column and the halide, either by itself or more usually as a solution in the solvent, is withdrawn as bottom product. This method of operation has the advantage that the reaction products are removed from the zone of reaction as soon as formed with the result that the preferred reaction is favored and side reactions are minimized.

Effluent from reactor 8 containing the hailde and solvent along with small quantities of hydrogen chloride and unreacted mercaptan and chlorine passes via line 13 to amination reactor 14 provided with agitator 15. The amine from storage 16 enters reactor 14 via line 17, and the desired reaction between the halide and the amine for the formation of the corresponding amide takes place.

The effluent from reactor 14 which comprises the amide and solvent along with unconverted reactants passes via line 18 to fractionator 19 where the solvent is removed overhead for recycle via line 5. The higher boiling residue passes via line 20 to vacuum fractionator 21 from which the desired amide is discharged as product via line 22 and higher boiling bottoms are removed via line 23.

Conditions of temperature and pressure can be substantially the same in both the halogenation and amination steps. I prefer to use a temperature for amination within the range of −20 to 120° F. and more preferably from 40 to 60° F., although temperatures outside the broad range can be employed. The amination pressure will usually be atmospheric, but higher and lower pressures can be used, when desired.

In the above description of my drawing, I have described a process wherein an alkyl mercaptan is halogenated and the resulting product is subsequently aminated. From the complete disclosure of my invention, numerous modifications are possible and are within the scope of my invention. For example, I can use a dialkyl disulfide in place of an alkyl mercaptan. Also, if it is desired to produce the halide as the reaction product, line 13 can be opened prior to the introduction of the halide into the amination reactor with the consequent withdrawal of the halide.

The following specific examples are illustrative of my invention.

Example I

Tert-butyl mercaptan (0.5 mol—45 grams) was added to 200 grams of C.P. n-pentane. The reaction mixture was stirred during the addition of 35.5 grams (0.5 mols) of chlorine, which was added by bubbling into the reaction mixture. The temperature was held at about 85° F. during the reaction. A Dry Ice-cooled condenser allowed the hydrogen chloride to vent from the reaction and returned any chlorine and heavier volatilized material. Tertiary butyl sulfenyl chloride was formed as a predominant product together with a minor amount of tertiary butyl thiosulfenyl chloride. Morpholine (1.5 mols—120 grams) was added. The reaction mixture was poured into water and washed several times to remove morpholine and morpholine hydrochloride. The pentane was then removed in vacuo and the resulting liquid was stripped in vacuo at 1 mm. for 5 hours. The crude product weighed 66 grams, had a refractive index $n_D^{25}=1.4835$ and contained 6.5 percent nitrogen by Kjeldahl analysis. Distillation gave a fraction boiling at 122° F./1 mm., $n_D^{25}=1.4745$, containing 7.2 percent nitrogen or an indicated 90 percent purity for 4-(tert-butylsulfenyl) morpholine. A minor proportion of 4-(tert-butylthiosulfenyl) morpholine was formed. Analyses also indicated 19.2 percent sulfur, 54.4 percent carbon and 10.1 percent hydrogen. Theoretical values for $C_8H_{17}NOS$ are: 18.5 percent sulfur, 55.0 percent carbon, 9.7 percent hydrogen and 8.0 percent nitrogen.

Example II

Di-tert-butyldisulfide (0.5 mol—89 grams) was dissolved in 200 grams C.P. n-pentane. Chlorine (0.5 mol—35.5 grams) was added by bubbling through the solution while holding the temperature at about 85° F. There was no evolution of hydrogen chloride during the first twenty percent of the reaction but vented hydrogen chloride became appreciable towards the end of the chlorine addition. Tertiary butyl sulfenyl chloride was formed as a predominant product together with a minor amount of tertiary butyl thiosulfenyl chloride. Morpholine (2.5 mols—220 grams) was added, giving a vigorous reaction and a heavy precipitate. The product was washed first with water and then with acid, dried and the pentane removed in vacuo. 134 grams of a light golden colored liquid remained after stripping in vacuo at 1 mm. for 5 hours. The crude product had a refractive index $n_D^{25}=1.4835$ and contained 6.7 percent nitrogen by Kjeldahl analysis. This indicated a purity of about 84 percent for 4-(tert-butylsulfenyl) morpholine. A minor proportion of 4-(tert-butylthiosulfenyl) morpholine was formed. Distillation of 100 grams of product gave the following cuts:

(1) 46 ml. $n_D^{25}=1.4750$ B.P. 122° F./1 mm.
(2) 5 ml. $n_D^{25}=1.4750$ B.P. 122–130° F./1 mm.
(3) Residue $n_D^{25}=1.4910$ This example shows the use of a disulfide as the starting material.

Example III

Tert-butyl mercaptan (0.5 mol—45 grams) was dissolved in 400 grams C.P. n-pentane. Chlorine (0.5 mol—35.5 grams) was added by bubbling while holding the reaction temperature at about 85° F. The product was then added slowly to a stirred solution containing aniline and n-pentane. The crude product was washed with dilute acid and with water and was subsequently dried and distilled. The product had a boiling range 135–140° F./1 mm. and analysis indicated 85% sulfenamide content based on Kjeldahl nitrogen analysis comprising phenyl tert-butylsulfenamide as predominant product together with a minor proportion of phenyl tertiary butylthiosulfenamide.

Example IV 76 grams (1 mol) of isopropyl mercaptan were dissolved in 1200 ml. of isopentane, the mixture was heated to 86° F. and a stream of gaseous chlorine was added thereto, under reflux, until 71 grams had been added, after which the reaction mixture, containing isopropyl sulfenyl chloride, was passed to a second reactor and admixed with 170 grams of piperidine dissolved in 200 cc. isopentane. The mixture was stirred for 30 minutes, washed with 500 ml. of water and the isopentane was removed by fractionation and the product distilled in vacuo. A crude yield of 142 grams was obtained representing a yield of 89 percent. The product was distilled to give 130 grams (82%) of sulfenamide. Properties of the 1-(isopropylsulfenyl) piperidine thus obtained were, boiling point 140–142° F. at 8 mm., index of refraction $n_D^{20}=1.4812$.

Example V

The experiment of Example IV was repeated except that the starting material was ethyl mercaptan. Sixty-two grams of ethyl mercaptan dissolved in 1200 ml. of isopentane was chlorinated at 86° F., under reflux. The halogenation effluent, containing ethyl sulfenyl chloride, was added to a solution of 170 grams of piperidine in isopentane. The crude yield of prodct was 127 grams (88%). The crude product was distilled to give 108 grams (74%) of pure sulfenamide, with a boiling point of 122° F. at 7 mm., $n_D^{20}=1.4900$. Sulfur analysis: Found 21.97%, calculated 22.07%.

Repeating the experiment except that the piperidine solution was added to the ethylsulfenyl chloride solution gave a yield of pure product of 46.5%.

Example VI

Tert-butylthiosulfenyl chloride was prepared by dissolving 0.75 mol of ditertiary-butyl disulfide in 1600 ml. of isopentane, cooling to −100° F. and passing a stream of dry chlorine into the well-stirred solution until an equivalent amount (0.75 mol) of chlorine had been added. Loss of unreacted chlorine was substantially reduced by venting the reactor through a condenser cooled by Dry Ice. The mixture was stirred vigorously during the addition of the chlorine and for one hour thereafter. Nitrogen was used to blanket the reaction mixture.

The yield of tertiary-butylthiosulfenyl chloride was determined by preparing the piperidine derivative which is formed substantially quantitatively and which is stable and easily isolated by distillation. Thus the yield of 1-(tert-butylthiosulfenyl) piperidine gives a direct measure of the yield of tertiary-butylthiosulfenyl chloride obtained. It was found that 92 percent of the disulfide reacted had been converted to tertiary-butylthiosulfenyl chloride and eight percent to tertiary-butylsulfenyl chloride.

The 1-(tert-butylthiosulfenyl) piperidine from tertiary-butylthiosulfenyl chloride and piperidine was distilled at 172.4° F. under 1 mm. pressure. Its index of refraction was $n_D^{20}=1.5210$ and upon analysis showed 7.04 percent nitrogen and 30.42 percent sulfur as compared with calculated values of 6.83 and 31.22 percent, respectively.

Example VII

A series of four runs was made in which the experiment of Example VI was repeated using operating temperatures of —103, —49, 32 and 86° F., respectively. The product from each run was converted to the piperidine derivative and the comparative yields of tertiary-butylthiosulfenyl chloride and tertiary-butylsulfenyl chloride for each run determined by this method. The results are tabulated below.

| Run | Temperature Chlorination (° F.) | Thiosulfenyl Chloride Yield (percent) | Sulfenyl Chloride Yield (percent) |
|---|---|---|---|
| 1 | —103 | 89 | 8 |
| 2 | —49 | 77 | 19 |
| 3 | 32 | 31 | 65 |
| 4 | 86 | 13 | 83 |

By this series of runs it was demonstrated that at low temperatures, symmetrical cleavage of the disulfide to form sulfenyl chloride is suppressed, and a high degree of conversion to tertiary-butylthiosulfenyl chloride is obtained.

Example VIII

A run was made in which n-butyl disulfide, dissolved in isopentane, was treated with elemental chlorine at —40° F. The reaction product, containing n-butylsulfenyl chloride, was added to a solution of piperidine in aqueous caustic. Recovery of the produce formed provided 170 grams (98 percent yield) of crude material which when distilled gave 47 grams (85 percent yield) of material which, by its boiling point and refractive index, was identified as 1-(n-butylsulfenyl) piperidine; boiling point, 138.2–140° F. at 0.5 mm. and $n_D^{20}$, 1.4858.

Example IX

A run was made in which isopropyl mercaptan was dissolved in isopentane and converted to disulfide and treated with elemental chlorine at —40° F. The reaction product solution was added to a solution of piperidine in aqueous caustic. The product recovered was found to be 1-(isopropylsulfenyl) piperidine in an 83 percent yield based on mercaptan charged.

Example X 175 grams (0.75 mol) of a di-tert-hexyl disulfide fraction having a boiling point of 194° F. at 4 mm. were dissolved in 1600 ml. of isopentane, and the solution was refluxed during the addition of 0.75 mol of chlorine. The resulting solution, containing a predominant proportion of tert-hexylsulfenyl chloride and a minor proportion of tert-hexylthiosulfenyl chloride, was added to a mixture of 127 grams (1.5 mols) of piperidine in 200 ml. of pentane and 60 grams of sodium hydroxide in 200 ml. of water. The product was depentanized and distilled to yield 267 grams (89%) of crude material. This product was distilled to give 194 grams (65%) of 1-(tert-hexylsulfenyl piperidine) fraction boiling from 161.6 to 176° F. at 2 mm. and having a refractive index, $n_D^{20}$, 1.4822 to 1.4862. A minor proportion of 1-(tert-hexylthiosulfenyl)piperidine was also formed.

Example XI

Two runs were made, charging in each case, 103 grams of di-tertiary-amyldisulfide dissolved in 900 ml. of isopentane and chlorinating in an inert atmosphere at 86° F. and —40° F., respectively. Tertiary amyl sulfenyl chloride and tertiary amyl thiosulfenyl chloride were produced respectively as chief products of these runs. The reaction mixture from each run was added to a solution of 45 grams of dimethylamine and 40 grams of sodium hydroxide in 200 ml. of water. The solvent was then removed and the product distilled under reduced pressure.

From the run made at 86° F., 128 grams of crude product was obtained. The middle cut from the distillation of this material provided 78 grams of product boiling at 134° F. under 30 mm. pressure. This product had an index of refraction of 1.4510 and was found to have a sulfur content (semimicro Carius) of 21.1 percent, agreeing closely with the calculated value of 21.7 percent for N,N-dimethyl-tertiary-amylsulfenamide.

From the run made at —40° F., 92 grams of crude product was obtained. The middle cut from the distillation of this material provided 46 grams of product boiling between 140 and 185° F. at 4 mm. pressure. This product had an index of refraction of 1.5069 and a sulfur content (semimicro Carius) of 33.7 approximating the calculated value of 35.6 percent for N,N-dimethyl-tertiary-amylthiosulfenamide.

Based on the separations made in the fractionations the yields from these runs were as follows:

| | | |
|---|---|---|
| Chlorination Temperature, ° F | 86 | —40 |
| Yield of Sulfenamide (percent) (Based on disulfide) | 71 | 7 |
| Yield of Thiosulfenamide (percent) (Based on disulfide) | 23 | 86 |
| Total Yield (percent) | 94 | 93 |

Example XII

In a series of runs, conducted at various temperature levels, tertiary butyl mercaptan and di-tertiary butyl disulfide were separately reacted with chlorine, in the presence of a hydrocarbon solvent to form tertiary butylsulfenyl chloride. The preparations were carried out under refluxing or non-refluxing conditions dependent upon whether the reaction temperature was below the boiling point of the reaction mixture (atmospheric pressure); the reaction mixture being blanketed with nitrogen, when employing non-refluxing conditions.

Tertiary butyl mercaptan, or the di-tertiary-butyl disulfide, and solvent, were charged to the reaction flask, agitation by stirring was initiated, and the resulting solution was heated to reaction temperature. Upon reaching reaction temperature, chlorine was introduced to the stirred reaction mixture and addition was continued until substantially one mol of chlorine per mol of mercaptan or disulfide reactant had been added. Under these conditions chlorine reacted with the disulfide or mercaptan to form the corresponding alkyl sulfenyl chloride. The reaction mixture was then cooled to room temperature, and product yield (tertiary butylsulfenyl chloride) was determined, based upon substantially quantitative reaction of the chloride product with sodium dimethyl dithiocarbamate to produce N,N-dimethyl-tert-butylsulfenyl dithiocarbamate, the latter reaction and product recovery being conducted by admixing total reaction mixture with a molar equivalent (of 100% yield of chloride product) of 40% aqueous sodium dimethyl dithiocarbamate solution, stirring the resulting solution admixture for about 7 minutes, separating the phases, washing the oil phase with water, and crystallizing the resulting N,N-dimethyl-tert-butylsulfenyl dithiocarbamate from the washed oil phase.

In the runs, the following reactant quantities were employed:

|  | Disulfide | Mercaptan |
|---|---|---|
| Solvent, cc | 575 | 575 |
| Di-t-butyl disulfide (10% excess), grams | 70.2 | |
| t-Butyl mercaptan (10% excess), grams | | 70.9 |
| Chlorine, grams | 25.8 | 51.6 |
| Sodium dimethyldithiocarbamate (40% aqueous), grams | 260 | 260 |

Results of these runs are set forth in the following tabulation:

TABLE I

| Run No. | Starting Material | Solvent | Chlorination Temperature (° F.) | Yield [1] of Tertiary Butylsulfenyl Chloride (Mol percent) |
|---|---|---|---|---|
| 1 | Di-tert-butyl disulfide | n-Heptane | 80 to 90 | 75.5 |
| 1 | do | do | 204 | 68.3 |
| 3 | do | Kerosene | 208 to 217 | 66.5 |
| 4 | do | do | 208 to 217 | 65.2 |
| 5 | do | do | 296 to 304 | 39.2 |
| 6 | do | do | 296 to 304 | 33.8 |
| 7 | Tert-butyl Mercaptan | do | 27 to 32 | 42.7 |
| 8 | do | do | 208 to 217 | 35.9 |
| 9 | do | do | 298 to 306 | 27.3 |

[1] Based on N,N-dimethyl-tert-butylsulfenyl dithiocarbamate recovered.

As illustrated by the above data, the temperature range is rather broad in which alkyl sulfenyl halides are formed in accordance with my invention, relatively high yields of halide products being obtained at temperatures as high as 300° F. and higher.

*Example XIII*

Tertiary butylsulfenyl chloride was prepared by interreaction of di-tert-butyl disulfide with chlorine in accordance with the procedure of Example XII, employing n-heptane as an inert solvent, in the presence of variable concentrations of water, the latter added with disulfide reactant to the reaction system. After the reaction, nitrogen was bubbled through the reaction solution to remove any remaining by-product hydrogen chloride. Product yields were determined in accordance with the procedure of Example XII.

In each run the reactant quantities employed were as follows:

n-Heptane _____cc__ 575
Di-tert-Butyl Disulfide (10% excess) __ grams__ 70.2
Water _____ Variable.
Chlorine _____ grams__ 25.8
Sodium Dimethyldithiocarbamate (40% aqueous) _____ grams__ 260

All runs were conducted at 80-90° F. Resulting data are set forth in the following tabulation:

TABLE II

| Run No. | Water (Vol. Percent of Solvent) | Moles Water per Atom of Chlorine | Yield of Tertiary Butylsulfenyl Chloride (Mole percent) |
|---|---|---|---|
| 10 [a] | 0 | 0 | 90.9 |
| 11 [b] | 0 | 0 | 90.4 |
| 12 | 1 | 0.45 | 79.5 |
| 13 | 5 | 2.25 | 66.5 |
| 14 | 10 | 4.50 | 62.2 |

[a] Tert-butylsulfenyl chloride prepared under anhydrous conditions.
[b] No special precautions taken to exclude water during preparation o tert-butylsulfenyl chloride.

These data illustrate that although the halide-forming reaction of this invention can be conducted in the presence of water, such as 10 volume percent, or higher, which is about 8 mols of water per mol of ditertiary butyl disulfide reactant, somewhat higher yields are obtained when lower concentrations of water are present. Also, the data illustrate that when reactants are employed in their normal state of purity (normal water content, i.e., in the absence of added water) substantially the same product yield is obtained as when they are predried.

*Example XIV*

Tertiary butylsulfenyl chloride was prepared by reacting di-tertiary butyl disulfide with chlorine, in the absence of an inert solvent; an excess of the disulfide reactant being employed and serving as a reaction mixture diluent. Except for the absence of solvent, the present run was carried out, and product yield was determined, in accordance with the procedure of Example XII. In carrying out this run, 650 cc. of di-tert-butyl disulfide, and 25.8 grams of chlorine were introduced into the reaction system maintained at 80.6-89.6° F. the product yield (tert-butylsulfenyl chloride) being 53.8 mol percent.

These data illustrate that in carrying out the process of this invention is not required that an inert solvent be employed, i.e., only the halogen, disulfide or mercaptan reactants need be introduced into the reaction system to produce the halide products of this invention.

Reasonable variation and modification are possible within the scope of the foregoing disclosure, drawings, and appended claims to the invention, the essence of which is the production of alkyl sulfenyl halides and/or tertiary alkyl thiosulfenyl halides by effecting reaction of equimolar proportions of halogen with an alkyl mercaptan and/or a dialkyl disulfide, for example a mercaptan or a dialkyl disulfide containing a tertiary alkyl radical; and that tertiary alkyl thiosulfenyl halides are provided as new compounds per se, herein being set forth.

I claim:

1. A tertiary alkyl thiosulfenyl chloride having the general formula RSSCl wherein R represents a tertiary alkyl radical having no more than twelve carbon atoms.

2. As a compound, tertiary butyl thiosulfenyl chloride.

3. As a compound, tertiary amyl thiosulfenyl chloride.

4. As a compound, tertiary hexyl thiosulfenyl chloride.

5. A process which comprises reacting a compound selected from the group consisting of tertiary alkyl mercaptans and tertiary dialkyl disulfides, which compound contains not more than 12 carbon atoms per alkyl group, with an equimolar proportion of chlorine at a temperature within the range of —300 to —30° F. and thereby forming a tertiary alkyl thiosulfenyl chloride.

6. The process which comprises reacting a compound selected from the group consisting of tertiary alkyl mercaptans and tertiary dialkyl disulfides, which compound contains not more than 12 carbon atoms per alkyl group, with an equimolecular proportion of chlorine under anhydrous conditions in an inert solvent and at a temperature within the range of —300 to —30° F.

7. A process according to claim 6 wherein the chlorine is reacted with ditertiary butyl disulfide and the principal reaction product is tertiary butyl thiosulfenyl chloride.

8. A process according to claim 6 wherein the solvent is a normally liquid hydrocarbon.

9. A process according to claim 6 wherein the temperature is within the range of —125 to —50° F.

References Cited in the file of this patent

UNITED STATES PATENTS 2,045,888    Tschunkur et al. _____ June 30, 1936

(Other references on following page)

UNITED STATES PATENTS

| | | |
|---|---|---|
| 2,123,082 | Schulze | July 5, 1938 |
| 2,216,515 | Johnson | Oct. 1, 1940 |
| 2,268,467 | Ashworth | Dec. 30, 1941 |
| 2,277,325 | Hueter | Mar. 24, 1942 |
| 2,339,002 | Cooper | Jan. 11, 1944 |
| 2,419,283 | Paul et al. | Apr. 22, 1947 |
| 2,520,401 | Himel et al. | Aug. 29, 1950 |
| 2,572,567 | Himel et al. | Oct. 23, 1951 |
| 2,572,845 | Himel et al. | Oct. 30, 1951 |

FOREIGN PATENTS

| | | |
|---|---|---|
| 423,232 | Germany | Dec. 29, 1925 |

OTHER REFERENCES

Chem. Abstracts, vol. 32, col. 5777 (1938).
Rheinboldt: Berichte, vol. 72, pp. 663–670 (1939).
Kharasch et al.: Chem. Reviews, vol. 39, pp. 278–289 (1946).
Fuson et al.: J. Org. Chem., vol. 11, pp. 469–474 (1946).